United States Patent [19]
Yamada et al.

[11] Patent Number: 5,931,895
[45] Date of Patent: Aug. 3, 1999

[54] FLOATING-POINT ARITHMETIC PROCESSING APPARATUS

[75] Inventors: Hiromichi Yamada, Hadano; Fumio Murabayashi, Ibaraki-ken; Tatsumi Yamauchi, Hitachiota; Noriyasu Ido; Yoshikazu Kiyoshige, both of Hadano; Takahiro Nishiyama, Ebina; Eiki Kamada, Hadano, all of Japan

[73] Assignee: Hitachi, Ltd., Tokyo, Japan

[21] Appl. No.: 08/789,430

[22] Filed: Jan. 29, 1997

[30] Foreign Application Priority Data

Jan. 31, 1996 [JP] Japan .................................. 8-015760

[51] Int. Cl.$^6$ ........................................................ G06F 7/52
[52] U.S. Cl. ............................................ 708/500; 708/205
[58] Field of Search ............................... 364/715.04, 748, 364/737, 748.01, 748.03, 748.04, 736.01, 745.03, 745.04

[56] References Cited

U.S. PATENT DOCUMENTS

| | | | |
|---|---|---|---|
| 4,779,220 | 10/1988 | Nukiyama | 364/748 |
| 5,289,396 | 2/1994 | Taniguchi | 364/737 |
| 5,469,377 | 11/1995 | Amano | 364/748 |
| 5,487,022 | 1/1996 | Simpson et al. | 364/715.04 |

FOREIGN PATENT DOCUMENTS 5-173760  7/1993  Japan .

OTHER PUBLICATIONS

American National Institute, Binary Floating-point Arithmetic, ANSI/IEEE Std 754–1985, Jul. 26, 1985.

*Primary Examiner*—Hassan Kizou
*Assistant Examiner*—Omar A. Omar
*Attorney, Agent, or Firm*—Antonelli, Terry, Stout & Kraus, LLP

[57] ABSTRACT

A floating-point arithmetic processing apparatus has a circuit for generating a limit value for normalization shift by subtracting an exponent of the minimum value of a normalized number from a value of an exponent of an intermediate result, and a circuit for generating, as a normalization shift number, smaller one of a shift number necessary for making the mantissa of the intermediate result a normalized number and the limit value for normalization shift. The floating-point arithmetic processing apparatus further has a circuit having a circuit for detecting a condition for overflow before the rounding process and a circuit for generating a value in the case of overflow, so that a predetermined value is delivered as a final result only when the overflow condition is detected before the rounding process but in the other case, a result obtained by performing the normalization process and the rounding process is delivered. When no overflow takes place before the rounding process but overflow occurs after the rounding process, the result obtained by performing the normalization process and the rounding process is delivered as a final result.

7 Claims, 8 Drawing Sheets

| COMMON EXPONENT (SIGNAL 111) | NORMALIZATION SHIFT LIMIT VALUE SIGNAL 151<br>k(0) k(1) · · · · · · · · · · · · · · · · · k(p) |
|---|---|
| 1 | 1.00000000000000000000000000 |
| 2 | 0.10000000000000000000000000 |
| ⋮ | ⋮ |
| p+1 | 0.00000000000000000000000001 |
| p+2 OR MORE | 0.00000000000000000000000000 |

EXAMPLE OF PRODUCTION OF NORMALIZED NUMBER

| PROCESS | PRODUCED DATA | |
|---|---|---|
| | EXPONENT | MANTISSA |
| ADDITION / SUBTRACTION | 13 | 00.00000000001011000111111 |
| NORMALIZATION SHIFT LIMIT VALUE SIGNAL | — | 0.00000000001000000000000 |
| SHIFT NUMBER CALCULATION | 12 | 00.00000000001000000000000 |
| EXPONENT CORRECTION | 1/2 | — |
| NORMALIZATION SHIFT | — | 01.01100011111000000000000 |

FIG. 6B

EXAMPLE OF PRODUCTION OF DENORMALIZED NUMBER

| PROCESS | PRODUCED DATA | |
|---|---|---|
| | EXPONENT | MANTISSA |
| ADDITION / SUBTRACTION | 13 | 00.00000000000011000111111 |
| NORMALIZATION SHIFT LIMIT VALUE SIGNAL | — | 0.00000000001000000000000 |
| SHIFT NUMBER CALCULATION | 12 | 00.00000000001000000000000 |
| EXPONENT CORRECTION | 1/2 | — |
| NORMALIZATION SHIFT | — | 00.01100011111000000000000 |

FLOATING-POINT ARITHMETIC PROCESSING APPARATUS

BACKGROUND OF THE INVENTION

1. Field of the Invention

The present invention relates to a floating-point arithmetic processing apparatus for use in LSI's such as a microprocessor and a floating-point arithmetic chip each incorporating the floating-point arithmetic function, wherein when an underflow exception arises in which the arithmetic result is so small a number that cannot be expressed as a normalized number, a denormalized number is produced as the arithmetic result and when an overflow exception occurs in which the arithmetic result is so large a number that cannot be expressed as a normalized number, a predetermined, specified value is produced as the arithmetic result.

2. Description of the Related Art

In the floating-point arithmetic processing, unless an arithmetic operation is carried out after it is confirmed in advance that underflow and overflow exceptions will not occur, the occurrence of these exceptions cannot be avoided. To process these exceptions, a method of generating an interruption or trap in the instruction process and performing calculation pursuant to a precedently prepared software program and a method of performing calculation with hardware without generating an interruption or trap are conceivable but for the purpose of obtaining high arithmetic performance, the latter method based on hardware may preferably be used. In effect, most of microprocessors having the floating-point arithmetic function support the exception process by means of hardware.

In the case where floating point numbers are processed on a computer, the standard format stipulated by IEEE-47 which is a standard specification of floating-point arithmetic operations is generally used as an expressing format of floating point numbers. A floating point number expressed by data consisting of sign s, exponent e and fraction f takes a numerical value indicated by the following expression:

$$(-1)^s \times 2^{(e-b)} \times (1.f) \qquad (1)$$

where b is called an exponent bias that is a bias for negative number representation and takes a value which is about half the maximum value of exponent e. The fraction f is added with integer 1, so that the combination of integer and fraction is called a mantissa. The thus indicated numerical value is called a normalized number. In the present specification, values other than the mantissa will be decimal unless specifically noticed to the contrary. The mantissa is binary.

Firstly, the process to be performed upon occurrence of an underflow exception will be described. Here, an example of single format will be handled. The single format of the IEEE-754 standard format is 32-bit data consisting of a 1-bit sign, an 8-bit exponent and a 23-bit fraction. The exponent bias value is 127. As an example of underflow exception, subtraction between two single format data pieces indicated by expressions (2) and (3) is considered:

$$(-1)^0 \times 2^{(11-b)} \times (1.00000000000000100100010) \qquad (2)$$

$$(-1)^0 \times 2^{(10-b)} \times (1.11111111111000000000000) \qquad (3)$$

Firstly, a smaller exponent of one of the two numerical values is rendered to be equal to a larger exponent of the other numerical value. At that time, the mantissa associated with the smaller exponent is shifted in the lower bit direction by a difference between the two exponents. This process is called alignment shifting through which expression (3) is converted into expression (4):

$$(-1)^0 \times 2^{(11-b)} \times (1.11111111111100000000000) \qquad (4)$$

Next, the mantissa of expression (4) is subtracted from that of expression (2). A result is given by expression (5). The result obtained by performing the bit matching and arithmetic operation is called an intermediate result.

$$(-1)^0 \times 2^{(11-b)} \times (0.00000000001001001000100) \qquad (5)$$

The intermediate result is applied with the normalization process and the rounding process.

The mantissa of expression (5) has an integer which is 0 and cannot be a normalized number. To make the mantissa an normalized number, the uppermost "1" in the mantissa (that is, a bit which first assumes "1" as viewed from the most significant bit) is found and the mantissa is shifted as a whole so that this bit may fall in the integer. In the case of expression (5), the shift number or the number of shifting operations is 12. Next, the number by which the mantissa is shifted is subtracted from the exponent. The above procedures are called normalization through which expression (5) is converted into expression (6):

$$(-1)^0 \times 2^{(-1-b)} \times (1.00100100010000000000000) \qquad (6)$$

In expression (6), the exponent is "−1". Since any floating point numbers other than zero must have an exponent of "1" or more as stipulated by IEEE-745, +2 is added to the exponent so that the exponent may assume "1" and the mantissa is shifted as a whole by 2 bits in the lower bit direction. A result is indicated in expression (7):

$$(-1)^0 \times 2^{(1-b)} \times (0.01001001000100000000000) \qquad (7)$$

Finally, the rounding process is carried out in order that the mantissa of expression (7) can meet the precision (the integer of 1 bit and the fraction of 23 bits) stipulated by the format. A result is indicated in expression (8):

$$(-1)^0 \times 2^{(1-b)} \times (0.01001001000100000000000) \qquad (8)$$

In the value of expression (8), the exponent has the minimum value "1" and the integer of the mantissa is "0". This type of value is called a denormalized number. When a denormalized number is produced, status information indicating that an underflow exception is caused to occur and such a small value as above is generated is recorded and generally, the denormalized number is taken for an arithmetic result. As an example, the floating point subtraction is described herein but an underflow exception will also occur in other arithmetic operations such as multiplication and combination of multiplication and addition.

Next, the process to be carried out upon the occurrence of an overflow exception will be described. Here, addition of two single format data pieces given by expressions (9) and (10) is considered.

$$(-1)^0 \times 2^{(254-b)} \times (1.11111110000000100100010) \quad (9)$$

$$(-1)^0 \times 2^{(250-b)} \times (1.00000000000000000000001) \quad (10)$$

Firstly, bit matching is performed to convert expression (10) having a smaller exponent into expression (11):

$$(-1)^0 \times 2^{(254-b)} \times (0.00010000000000000000000001) \quad (11)$$

Next, the mantissa of expression (9) and that of expression (11) are added together. The result is an intermediate result indicated by expression (12).

$$(-1)^0 \times 2^{(254-b)} \times (10.00001110000000100100010001) \quad (12)$$

The mantissa of expression (12) has an integer of "10" and cannot be a normalized number. To make the mantissa a normalized number, the mantissa as a whole is shifted by one bit in the lower bit direction and the exponent is added with +1. A result is indicated by expression (13):

$$(-1)^0 \times 2^{(255-b)} \times (1.000001110000000100100010001) \quad (13)$$

Here, the exponent of expression (13) exceeds 254 of the maximum value of normalized number stipulated by the IEEE-754, indicating that an overflow exception occurs. In this example, the overflow is settled before the rounding process is carried out but in some cases, the overflow is not settled until the rounding process ends. For example, given that a value before the rounding process is indicated by $$(-1)^0 \times 2^{(254-b)} \times (1.111111111111111111111111), \quad (14)$$

carry due to rounding occurs when the rounding process toward the nearest value is performed, as indicated by $$(-1)^0 \times 2^{(254-b)} \times (10.0000000000000000000000) \quad (15)$$

and an overflow exception occurs. On the other hand, when the rounding process toward zero is carried out, carry due to rounding does not occur as indicated by $$(-1)^0 \times 2^{(254-b)} \times (1.111111111111111111111111), \quad (16)$$

thus preventing an overflow exception from being raised.

In the event that an overflow exception occurs, status information indicative of the occurrence of the overflow exception is recorded and in general, the maximum value of normalized number given by the following expression (17) or a code of infinity given by the following expression (18) is rendered to be an arithmetic result.

$$(-1)^S \times 2^{(254-b)} \times (1.111111111111111111111111) \quad (17)$$

$$(-1)^S \times 2^{(255-b)} \times (1.0000000000000000000000) \quad (18)$$

Pursuant to the IEEE-754, the value "255" of the exponent in expression (18) is allotted to express infinity. As an example, the floating-point addition is described herein but an overflow exception will also occur in other arithmetic operations such as multiplication and combination of multiplication and addition.

The underflow exception process and overflow exception process in the floating-point arithmetic have been exemplified hereinbefore. In most of conventional floating-point arithmetic processing apparatus, after the normalization process and the rounding process are carried out, conditions for these exceptions are detected and when the conditions hold, another process step is required for calculating a result of underflow or overflow and an arithmetic result.

Figure 9:
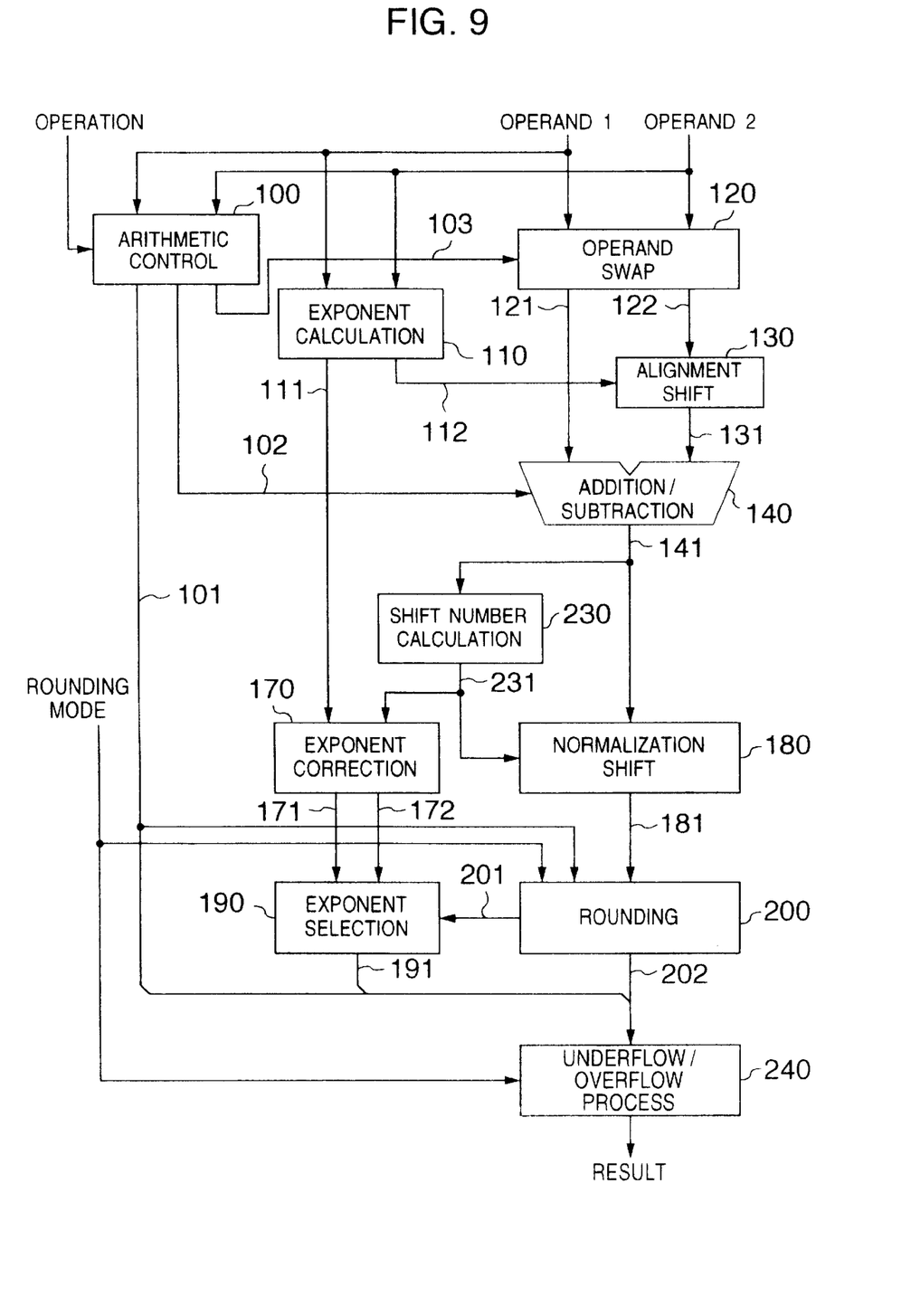
FIG. 9 is a block diagram of a conventional floating-point adder.

An example of this type of conventional floating-point arithmetic processing apparatus is shown in FIG. 9. This is an example of a floating-point adder/subtracter in which two floating-point operands are inputted and the addition/subtraction process, the normalization process and the rounding process are effected by command of an operation and a rounding mode.

In FIG. 9, an arithmetic control circuit 100 receives an operation signal for designating that either addition or subtraction is to be carried out and two operands to generate a sign 101 of an arithmetic result, a signal 102 indicating that mantissas are to be either added or subtracted, and a signal 103 indicating whether the mantissas of the two operands are passed through an operand swap circuit 120 so as to be delivered without alteration or these mantissas are interchanged with each other in the operand swap circuit 12 and then delivered. The signal 102 designates addition of the mantissas when operands of the same sign are subjected to addition operation and when operands of different signs are subjected to subtraction operation but designates subtraction of the mantissas when operands of the same sign are subjected to subtraction operation and when operands of different sings are subjected to addition operation. The signal 103 designates delivery of the mantissas without alteration when an absolute value of operand 1 is larger than or equal to an absolute value of operand 2 but designates mutual interchange of the mantissas and subsequent delivery of interchanged mantissas when the operand 1 is smaller than the operand 2 in absolute value.

An exponent calculating circuit 110 receives exponents of the two operands to deliver a larger value as a common exponent signal 111 and an absolute value of a difference between the exponents as an exponent difference signal 112. The common exponent is an exponent of an intermediate result.

The operand swap circuit 120 receives the mantissas of the two operands and when the signal 103 designates the delivery of the mantissas without alteration, it delivers the mantissa of operand 1 as a signal 121 and the mantissa of operand 2 as a signal 122. When the signal 103 designates that the mantissas are mutually interchanged and delivered, the operand swap circuit 120 delivers the mantissa of operand 1 as signal 122 and the mantissa of operand 2 as signal 121. A alignment shift circuit 130 shifts the signal 122 delivered out of the operand swap circuit 120 by a number indicated by the signal 112 in the lower bit direction. Through this process, a mantissa signal 131 is produced after a smaller absolute value in the operands is shifted to have the exponent of the other operand. An addition/subtraction circuit 140 receives two mantissa signals 121 and 131 after the bit matching process and when the signal 102 designates addition, it adds the signals 121 and 131 but when the signal 102 indicates subtraction, it subtracts the signal 131 from the signal 121, thereby producing an addition/subtraction result signal 141 of the mantissa. This addition/subtraction result represents the mentissa of the intermediate result.

A shift number calculating circuit 230 receives the addition/subtraction result signal 141 and calculates a shift number necessary to make a bit which first assumes "1" as viewed from the most significant bit of the signal 141 the first bit of the integer. Given that the upper bit direction is positive, the shift number takes any one of values −1, 0, . . . , p. Represented by p is the precision (the number of bits of the mantissa) of the floating-point format.

An exponent correcting circuit 170 receives the common exponent signal 111 and a normalization shift number signal 231 and calculates a result signal 171 obtained by subtracting the signal 231 from the signal 111 and a result signal 172 obtained by adding "1" to the difference of subtraction of the signal 231 from the signal 111. The signal 171 becomes effective when the mantissa of a result of the rounding process in a rounding circuit 200 is "1.x . . . x " (where x means a value of either "0" or "1") and the signal 172 becomes effective when the mantissa is "10.0 . . . 0). A normalization shift circuit 180 shifts the addition/subtraction result signal 141 by a value designated by the normalization shift number signal 231 in the upper bit direction. Thus, when the signal 231 indicates "−1", the signal 141 is shifted by one bit in the lower bit direction. In this manner, a mantissa signal 181 subject to the normalization process is produced.

An exponent selecting circuit 190 responds to a signal 201 delivered out of the rounding circuit 200 to select one of the signals 171 and 172. The rounding circuit 200 receives the mantissa signal 181 subject to the normalization shift process, the sign 101 of the arithmetic result and a rounding mode signal and carries out an arithmetic process for confining the signal 181 within the precision of the format, thus delivering a mantissa result signal 202. If the mantissa takes a value of "10.0 . . . 0" through this process, the signal 201 indicating that the mantissa overflows is delivered. The exponent selecting circuit 190 selects the signal 171 in the absence of the delivery of the signal 201 but selects the signal 172 in the presence of the delivery of the signal 201, thereby delivering an exponent result signal 191.

Finally, an underflow/overflow processing circuit 240 receives the sign signal 101 of the arithmetic result applied with the normalization process and rounding process, the exponent signal 191 and the mantissa signal 202 and performs detection of underflow and overflow conditions, thus producing a value to be delivered as a final result upon detection of the conditions. When the exponent signal 191 is "0" or a negative number, the condition for underflow holds. In this case, a value to be added for making the exponent signal 191 the minimum value "1" of exponent is calculated and the thus calculated value is used to shift the mantissa signal 202 in the lower bit direction. On the other hand, in order to indicate that the arithmetic result is a denormalized number, the value of the exponent is replaced with "00". When the value indicated by the exponent signal 191 exceeds the maximum value, 254 in this example, which is the limit for expression of a normalized number, the condition for overflow holds. In this case, either the maximum value for the normalized number or a code indicative of infinity is selected as a final result in accordance with a combination of the sign of the arithmetic result and the rounding mode signal. When the exponent signal 191 does not meet any of the above cases, the underflow and overflow conditions do not hold and the signals 101, 191 and 202 are delivered without alteration to provide a final result.

A floating-point adder/subtracter described in JP-A-5-173760 is known as an improvement of the aforementioned conventional floating-point arithmetic processing apparatus. In the adder/subtracter, conditions sufficient for preventing underflow and overflow from occurring even when the normalization process is performed are detected by consulting a value of the exponent before the normalization process, and when the conditions hold, the value subject to the normalization process is selected as a final result. On the other hand, the conditions do not hold, an underflow or overflow condition is detected after the normalization process and when the exception is not detected, a value subject to the normalization process is determined as a final result but when the exception is detected, a predetermined, specified value is determined as a final result. The predetermined value is described as being zero in the case of underflow and a code indicating the maximum value of a normalized number or infinity in the case of overflow.

In the conventional floating-point arithmetic processing apparatus shown in FIG. 9, the underflow and overflow conditions are detected after both of normalization process and the rounding process and therefore, much time is consumed for obtaining the final result regardless of whether or not these conditions hold.

Contrary to this, in a floating-point adder/subtracter described in JP-A-5-173760, conditions sufficient for preventing underflow and overflow from occurring even when normalization is effected by consulting an exponent of an intermediate result, and when the conditions hold, a normalization result is taken for an arithmetic result. Accordingly, when the conditions hold, the time required for detecting an underflow or overflow condition from the normalization result and the time for producing a detection result can be eliminated to ensure speedup of arithmetic operation.

However, when the conditions do not hold, an arithmetic cycle for detecting an underflow or overflow condition from the normalization result and producing a detection result is needed. This means that for example, when the conditions hold, the arithmetic operation ends within 2 cycles but when the conditions do not hold, 3 cycles are needed, resulting in an disadvantage that the number of execution cycles of arithmetic operation cannot be fixed. Disadvantageously, this may make complicated the control operation in the pipe line processing which has been adopted widely in most of present-day floating-point arithmetic units.

Further, a method of calculating a denormalized number in the event of occurrence of underflow is not described. In the field of work stations and personal computers, compatibility between systems is highly thought of and generally, the floating-point arithmetic conforming to the IEEE-754 is supported. Even in the event of the occurrence of an underflow exception, a denormalized number must be produced in order to maintain the compatibility between arithmetic results.

In addition, the rounding process needed after the normalization process is not described, either. In the IEEE-754, four modes of rounding methods are stipulated, including rounding to nearest value, rounding to zero, rounding to positive infinity and rounding to negative infinity. Since underflow or overflow is determined for a result subject to the rounding process, the processing for underflow and overflow inclusive of the rounding process having the above four rounding modes must be considered.

SUMMARY OF THE INVENTION

An object of the present invention is to produce a denormalized number without using a superfluous arithmetic cycle even in the case of underflow by performing normalization shift of the mantissa of an intermediate result within the range in which the exponent does not fall below the minimum value of a normalized number in a floating-point arithmetic processing apparatus requiring the normalization process and the rounding process. Only when an overflow condition is detected before the rounding process, a value predetermined as a result of overflow is delivered as a final result and in other cases, a value as a result of the normalization process and rounding process is delivered, thereby minimizing the time required for overflow condition detection and final result selection.

A floating-point arithmetic processing apparatus according to the present invention comprises, with the aim of producing a denormalized number at a high speed, a circuit for generating a normalization shift limit value by subtracting the exponent of the minimum value of a normalized number from a value of the exponent of an intermediate result, and a circuit for generating, as a normalization shift number, smaller one of a shift number necessary for making the mantissa of the intermediate result a normalized number and the normalization shift limit value. With this construction, in the case where the result underflows, the denormalized number can be produced through one operation of normalization shift.

The normalization process for expression (5) will now be considered again.

$$(-1)^0 \times 2^{(11-b)} \times (0.00000000001001001000100) \qquad (5)$$

Since the exponent in expression (5) is "11" and the exponent of the minimum value of a normalized number is "1", a difference between these values, which is "10", is determined as a normalization shift limit value. On the other hand, the shift number necessary for making expression (5) a normalized number is "12". Of the two values, one smaller value which is "10" is determined as a normalization shift number used to perform the normalization process for expression (5), thus providing expression (19):

$$(-1)^0 \times 2^{(1-b)} \times (0.01001001000100000000000) \qquad (19)$$

The value of expression (19) is the same as that of the previous expression (7). Conventionally, for preparation of expression (7), two shift operations including shift from expression (5) to expression (6) and shift from expression (6) to expression (7) are carried out but according to this method, expression (19) can be prepared by one shift operation.

A floating-point arithmetic processing apparatus of the present invention comprises, with the aim of minimizing the time required for overflow condition detection and final result selection, a circuit for detecting a condition for overflow before the rounding process, a circuit for producing a value in the case of overflow, and a circuit for delivering the produced value as a final result only when the overflow condition is detected before the rounding process but for delivering a result obtained by performing the normalization process and the rounding process in other cases. In the case where no overflow takes place before the rounding process but overflow occurs after the rounding process, the result obtained through the normalization process and the rounding process is delivered as a final result. According to the standard of the IEEE-754, the result obtained through the normalization process and rounding process coincides with a value to be determined as a final result in the case of overflow.

It is now assumed that a value which prevails before the rounding process following the normalization process is given by expression (20):

$$(-1)^S \times 2^{(254-b)} \times (1.1111111111111111111111111) \qquad (20)$$

When the exponent exceeds the maximum value (here 254), an overflow detecting circuit determines that the overflow condition is satisfied. Accordingly, the value indicated by expression (20) is determined so as not to meet the overflow condition. Data in expression (20) contains all bits of "1" for the format range of the mantissa consisting of the integer and 23 bits of the fraction, and the data further contains outside the format range of the mantissa. A value produced by the rounding process conforms to either expression (21) for the case where carry to the mantissa is not caused or expression (22) for the case where carry is caused, in accordance with the rounding mode.

$$(-1)^S \times 2^{(254-b)} \times (1.11111111111111111111111) \qquad (21)$$

$$(-1)^S \times 2^{(254-b)} \times (10.00000000000000000000000) \qquad (22)$$

Expression (21) does not overflow but expression (22) overflows. In expression (22), the mantissa as a whole is shifted by one bit in the lower bit direction to make the integer "1" and the exponent is added with "1". This shift process is required when the integer exceeds a value of "1" as a result of the rounding process and it may be occur even when the result does not overflow.

In the case where overflow is raised as a result of the rounding process, a result obtained by performing the normalization process and the rounding process has a value given by expression (23):

$$(-1)^S \times 2^{(255-b)} \times (1.00000000000000000000000) \qquad (23)$$

On the other hand, a value to be delivered as a final result when the result overflows conforms to either one of the following two expressions in accordance with the rounding mode and the sign of an arithmetic result:

$$(-1)^S \times 2^{(254-b)} \times (1.11111111111111111111111) \qquad (24)$$

$$(-1)^S \times 2^{(254-b)} \times (1.00000000000000000000000) \qquad (25)$$

The value of expression (24) can be delivered under the condition that either rounding direction is toward zero, the sign of the result is positive and rounding is toward negative infinity or the sign of the result is negative and rounding is toward positive infinity. A result obtained by rounding the value of expression (20) under this condition is of the same value as that of expression (24). Next, the value of expression (25) can be delivered under the condition that either rounding is toward nearest value, the sign of the result is positive and rounding is toward positive infinity or the sign of the result is negative and rounding is toward negative infinity. A result obtained by rounding the value of expression (20) under this condition is of the same value as that of expression (25). Accordingly, the value of expression (24) or (25) is produced and delivered only when overflow occurs before the rounding process. But when no overflow occurs before the rounding process, a result obtained by performing the normalization process and the rounding process is delivered regardless of the presence or absence of overflow after the rounding process.

DESCRIPTION OF THE PREFERRED EMBODIMENTS

The present invention will now be described in greater detail by way of example with reference to the accompanying drawings.

Figure 2:
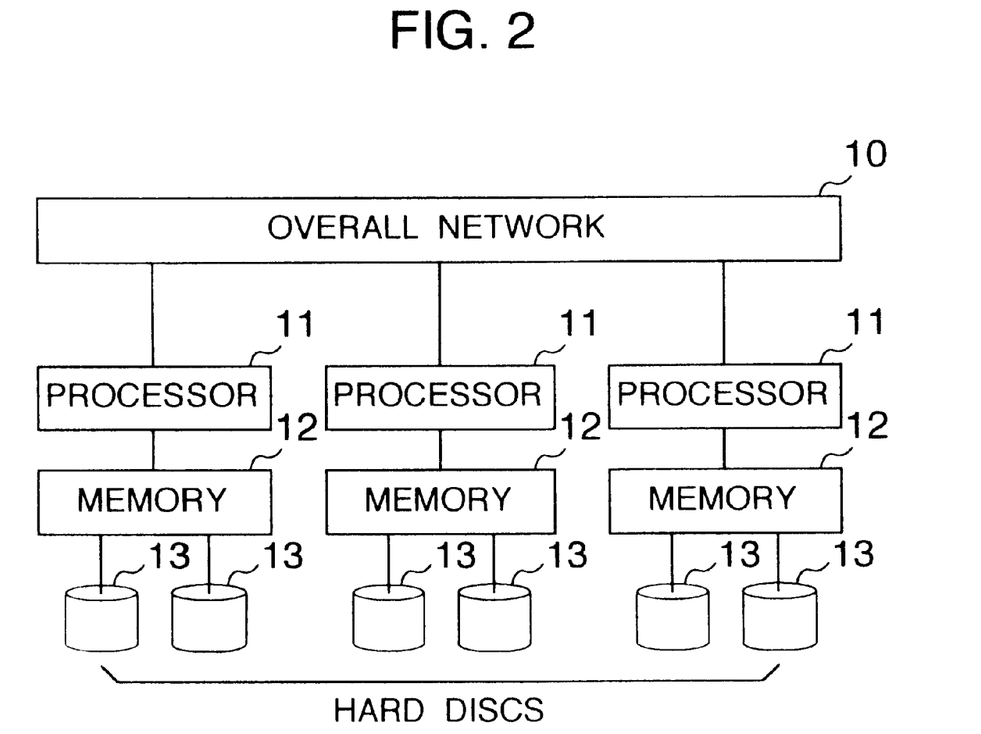
FIG. 2 is a diagram showing an example of a computer system to which the present invention is applied.

Referring to FIG. 2, there is illustrated an example of a computer system to which the present invention is applied. In this example, a plurality of computer systems each having a processor 11, a memory 12 and hard discs 13 are interconnected through an overall network 10. In this type of computer system, the present invention is applied to a section in processor 11 which performs addition/subtraction, product/sum arithmetic and the like of floating point numbers.

Figure 3:
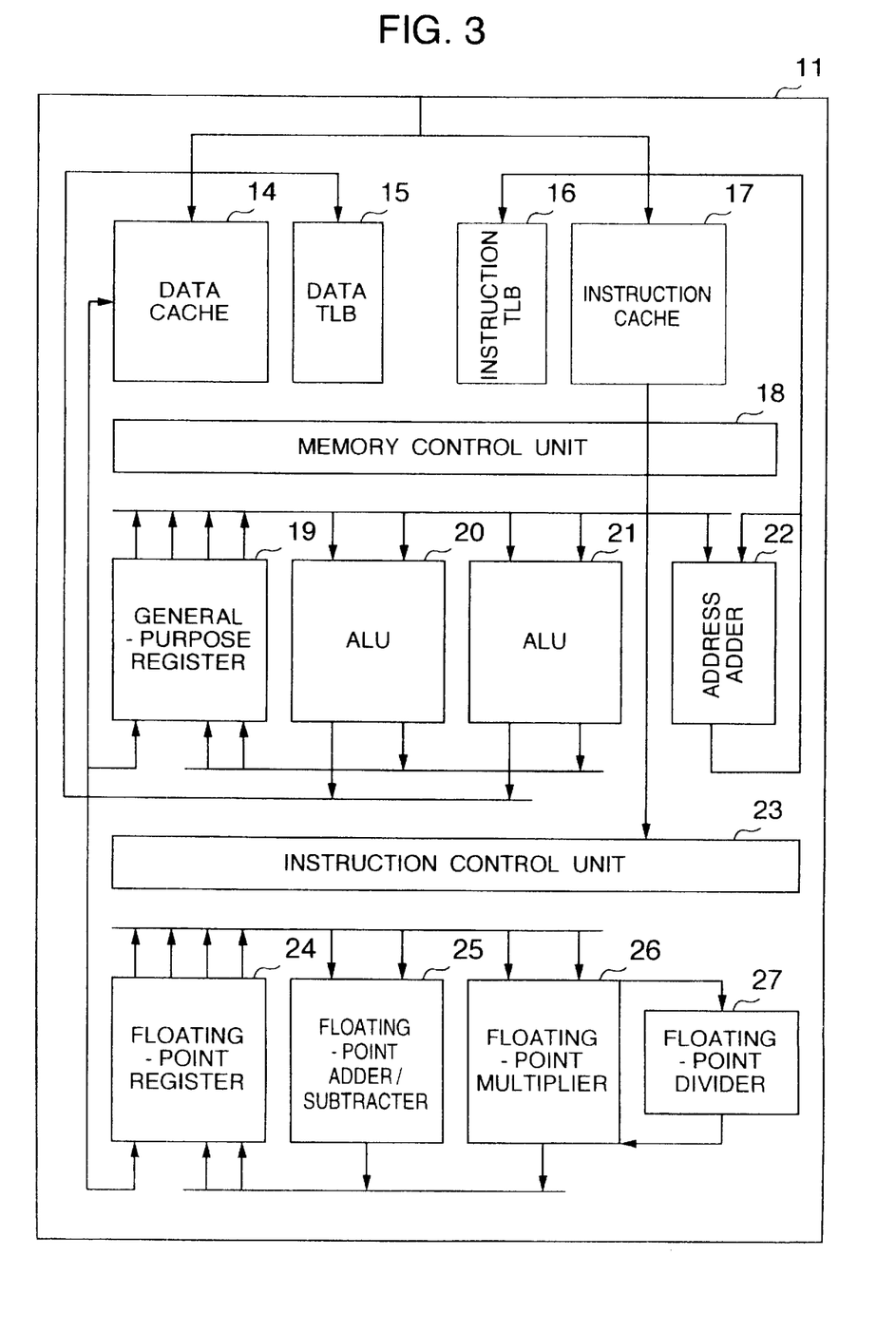
FIG. 3 is a block diagram showing an example of a processor in FIG. 2.

Referring now to FIG. 3, there is illustrated in block form an example of concrete construction of the processor 11. The processor 11 incorporates a data cache 14 and an instruction cache 17 so as to have the ability to access data and instructions at high speeds. Memory address conversion from virtual address to physical address is carried out using a data TLB (translation look-aside buffer) 15 and an instruction TLB 16 which hold the correspondence of virtual addresses converted in the past to real addresses. The memory address conversion is controlled by a memory control unit 18. Integer arithmetic operations are effected by a general-purpose register 19 and arithmetic and logic units (ALU's) 20 and 21. Instruction addresses are calculated using an address adder 22. Floating-point arithmetic operations are carried out using a floating-point register 24, a floating-point adder 25, a floating-point multiplier 26 and a floating-point divider 27. This operation is controlled by an instruction control unit 23. In the field of computer utilization for scientific computations, computer graphics and the like, very high floating-point arithmetic performance is required. Especially, of floating-point arithmetic instructions, the floating-point addition and multiplication are used frequently and therefore, an adder and a multiplier which can operate at high speeds are of importance. The present invention can be applied to the floating-point adder/subtracter 25 and the floating-point multiplier 26 which are required to operate at high speeds.

(1) Floating-point Adder/Subtracter

Figure 1:
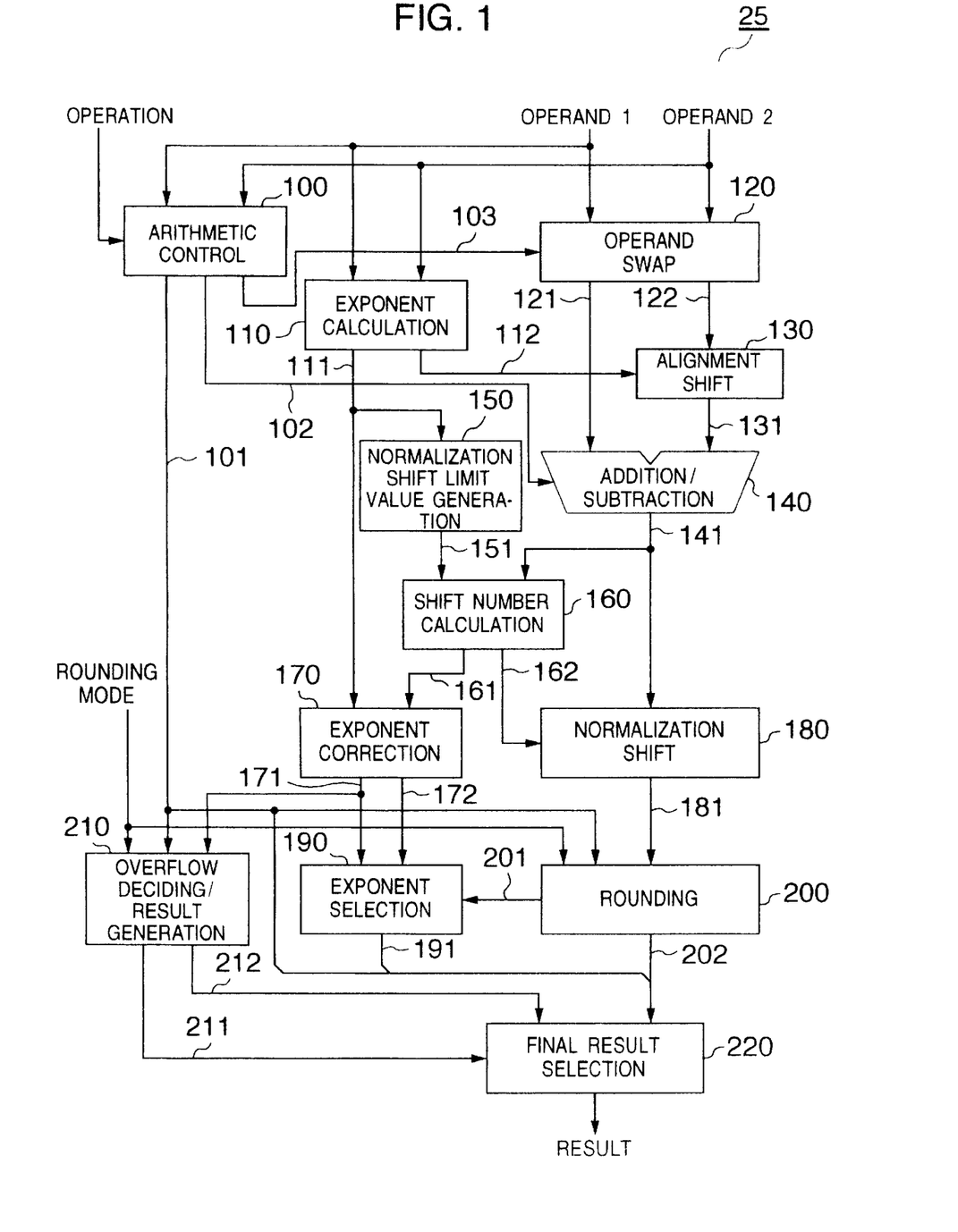
FIG. 1 is a block diagram of a floating-point adder according to the present invention.

Referring to FIG. 1, there is shown an embodiment of floating-point adder/subtracter 25 according to the present invention. In FIG. 1, an arithmetic control circuit 100, an exponent calculating circuit 110, an operand swap circuit 120, a alignment shift circuit 130 and an addition/subtraction circuit 140 function and operate in the same way as those of the conventional floating-point arithmetic apparatus of FIG. 9 and will not be described. In the figure, a normalization shift limit value generating circuit 150 and a shift number calculating circuit 160 provide a first feature of the present invention, and when the result corresponds to an underflow exception, a normalization shift circuit 180 is operated to produce a denormalized number.

Figure 4:
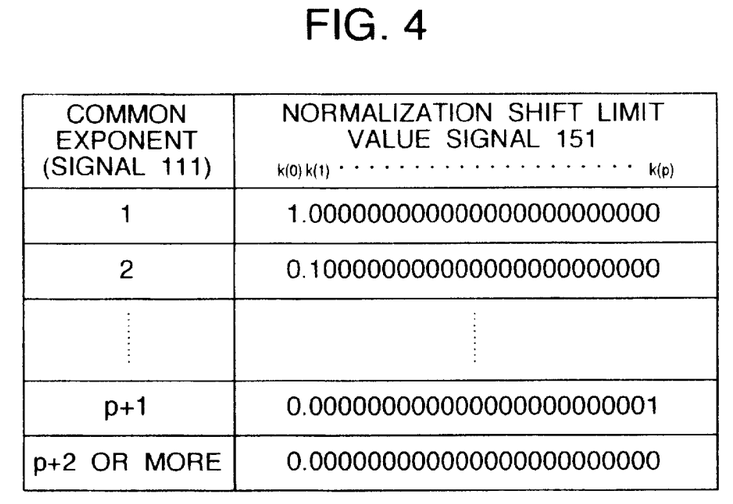
FIG. 4 is a diagram showing the relation between the common exponent signal and the normalization shift limit value.

The normalization shift limit value generating circuit 150 receives a common exponent signal (the exponent of an intermediate result) 111 to deliver a normalization shift limit value signal 151. The normalization shift limit value is a value which is obtained by subtracting the exponent (here, "1") of the minimum value of a normalized number from the exponent of the intermediate result. The signal 151 is representative of data assuming "1" only at bit which corresponds to a number indicated by the signal 111 as viewed from the most significant bit (or at bit which corresponds to a number indicated by the normalization shift limit value as viewed from the binary point) and assuming "0" at the other bits. The most significant bit corresponds to the first bit of the integer. Given that the precision (the number of bits of the mantissa) of the floating-point format is p, p+1 is sufficient for the number of bits in the signal 151. FIG. 4 shows the correspondence between the common exponent signal 111 and the normalization shift limit value signal 151.

More particularly, when the common exponent signal 111 falls within the range of from 1 to p+1, the normalization shift limit value signal 151 assumes "1" at any one of bits but when the common exponent signal is in the range in excess of p+2 inclusive, it assumes "0" at all of the bits. The normalization shift limit value generating circuit 150 is a kind of decode circuit which can easily generate the signal 151 by converting the signal 111 through the use of simplified decode logics.

The shift number calculating circuit 160 receives an addition/subtraction result signal (the mantissa of the intermediate result) 141 of the addition/subtraction circuit 140 and the normalization shift limit value signal 151 of the normalization shift limit value generating circuit 150 and makes smaller one of a shift bit number necessary for normalization of the addition/subtraction result signal 141 and the normalization shift limit value a normalization shift number. Then, the shift number calculating circuit 160 delivers the normalization shift number as an exponent correcting signal 161 to an exponent correcting circuit 170 and delivers it as a shift control signal 162 for shifting the addition/subtraction result signal 141 to the normalization shift circuit 180.

Figure 5:
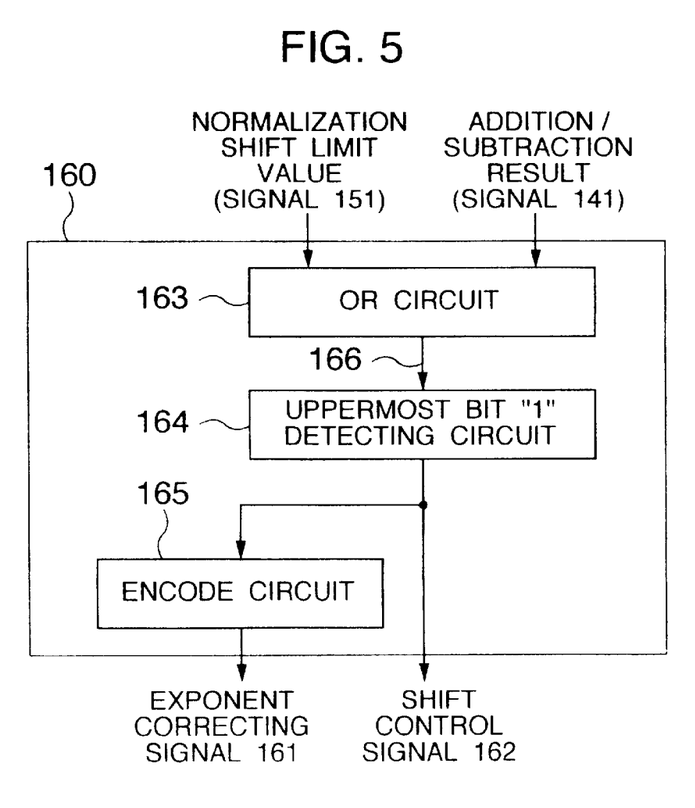
FIG. 5 is a block diagram of an embodiment of a shift number calculating circuit in FIG. 1.

Referring now to FIG. 5, there is illustrated in block diagram form an embodiment of the shift number calculating circuit 160. In FIG. 5, an OR circuit 163 performs OR-ing of the addition/subtraction result signal 141 and the normalization shift limit signal 151. Given that the signal 141 is indicated by expression (26) and the signal 151 by expression (27), a logical sum signal 166 is expressed by expression (28):

$$s(-1)s(0)s(1)s(2) \cdots s(i) \cdots s(p) \tag{26}$$

-continued $$k(0)k(1)k(2) \cdots k(i) \cdots k(p) \qquad (27)$$

$$x(-1)x(0)x(1)x(2) \cdots x(i) \cdots x(p), \qquad (28)$$
$$x(i) = s(i) | k(i)$$

In expression (26), s(−1) represents the second bit of the integer of the addition/subtraction result (the mantissa of the intermediate result), s(0) represents the first bit of the integer and s(1) . . . s(p) represent the fraction. In expression (27), k(0) . . . k(p) represent individual bits of the normalization shift limit value. Expression (28) is determined as a logical sum of the same bits of expressions (26) and (27), where x(−1)=s(−1).

An uppermost bit "1" detecting circuit 164 receives the logical sum signal 166 to convert it into the shift control signal 162 in which only the uppermost "1" bit remains "1" but all of the remaining bits are replaced with "0". Given that the signal 162 is indicated by expression (29):

$$n(-1)n(0)n(1)n(2) \cdots n(i) \cdots n(p), \qquad (29)$$

when for example the uppermost bit "1" in expression (28) is x(i), the value of expression (29) remains "1" only at n(i) and takes "0" at all of the remaining bits. In expression (29), a numeral in parenthesis means the number of bits by which the addition/subtraction result 141 is shifted in the upper bit direction in the normalization shift circuit 180. For example, when n(2) is "1", it is meant that the addition/subtraction result is shifted by 2 bits in the upper bit direction. When n(−1) is "1", it is meant that the addition/subtraction result is shifted by one digit in the lower digit direction. An encode circuit 165 converts the shift control signal into binary data. The resulting data serves as the exponent correcting signal 161 which in turn is used for subtracting of the bit number of normalization shift from the common exponent signal 111 in the exponent correcting circuit 170.

Alternatively, the shift number calculating circuit 160 may be realized so as to perform operation as below. More particularly, data in which a value of the mantissa of the intermediate result (signal 141) at a bit which is lower by the number of normalization shift limit value as viewed from the binary point is rewritten into "1" is produced and the number of bits counted down to a bit which first assumes "1" as viewed from the binary point of the data is detected to provide a shift number. For example, given that the mantissa of the intermediate result is "0.0001xx . . . " and the normalization shift limit value is "2", data in which "0.0001xx . . . " is rewritten into "0.0101xx . . . " is produced. Since a bit which first assumes "1" as viewed from the binary point of the data is the second bit, the shift number is determined as 2 bits. This is equivalent to OR-ing the same bits of expressions (26) and (27) to determine expression (28) and determining the shift number.

Returning to FIG. 1, the exponent correcting circuit 170 delivers two kinds of exponent correcting results of which one is a result signal 171 obtained by subtracting the exponent correcting signal 161 from the common exponent signal 111 and the other is a result signal 172 obtained by adding "1" to a difference of the subtraction of the exponent correcting signal 161 from the common exponent signal 111. The signal 171 becomes effective when the mantissa of the result subjected to the rounding process in the rounding circuit 200 is "1.x . . . x", where x represents a value being either "0" or "1", and the signal 172 becomes effective when the mantissa is "10.0 . . . 0".

Figure 6A:
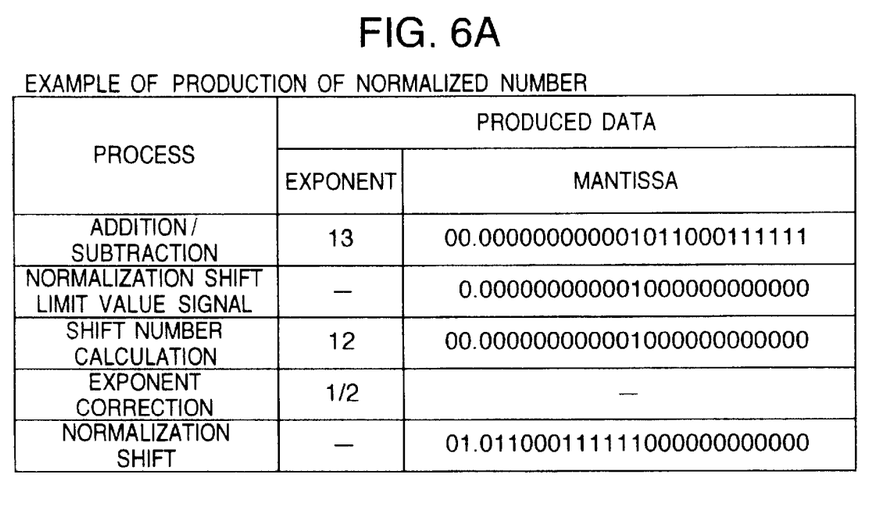
FIGS. 6A and 6B are diagrams showing the normalization shift process in FIG. 1.
Figure 6B:
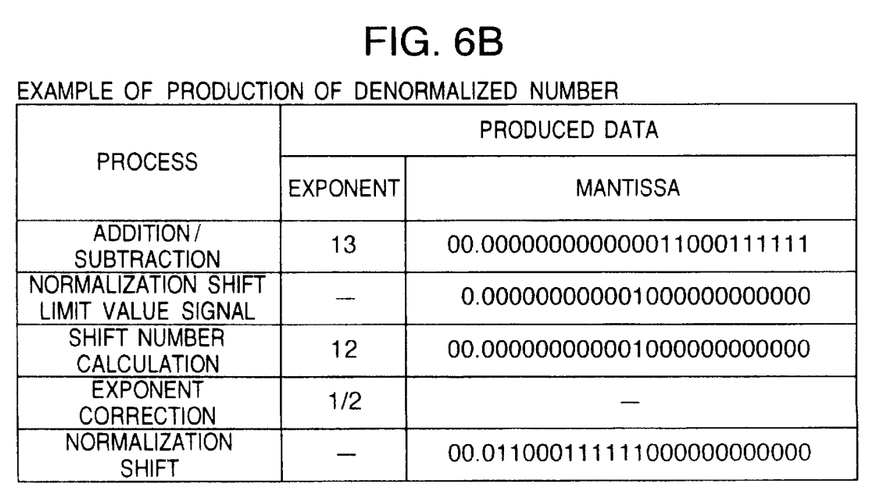

The normalization shift circuit 180 shifts the addition/subtraction result signal 141 in the upper bit direction by a value designated by the normalization shift control signal 162. When n(−1) in expression (29) is "1", the signal 141 is shifted by one bit in the lower bit direction. Through this one shift operation, a result of either normalized number or denormalized number can be produced. FIG. 6A shows an example where a normalized number is produced and FIG. 6B shows an example where a denormalized number is produced.

The example of FIG. 6A will first be described. It is assumed that in the phase of completion of the addition/subtraction process, the exponent (corresponding to the common exponent signal 111) has a value of 13 and the mantissa (corresponding to the addition/subtraction result 141) has a value as shown in the figure. The normalization shift limit value generating circuit 150 produces a normalization shift limit value signal 151 in which the thirteenth bit in the fraction bit direction as viewed from the first bit of the integer is "1" and the remaining bits are "0". Subsequently, by means of the shift number calculating circuit 160, the exponent correcting signal 161 is rendered to have a value of 12 and the shift control signal 162 is rendered to have a value which designates shifting of 12 upper bits. The exponent correcting circuit 170 calculates a value "1" which is a difference of subtraction of the exponent correcting signal 161 from the common exponent signal 111 and a value "2" which is obtained by adding "1" to the difference and delivers the exponent correcting result signals 171 and 172, The mantissa of the addition/subtraction result (signal 141) is shifted by 12 bits in the upper bit direction by means of the normalization shift circuit 180 and a value of normalized number as shown is delivered as a mantissa signal 181.

Next, the example of FIG. 6B will be described. It is now assumed that in the phase of completion of the addition/subtraction process, the exponent (common exponent signal 111) has a value of 13 and the mantissa (addition/subtraction result signal 141) has a value as shown in the figure. As compared to the value shown in FIG. 6A, the uppermost "1" bit of the mantissa is shifted by two bits in the lower bit direction. The normalization shift limit value generating circuit 150 produces data (signal 151) in which the thirteenth bit in the fraction bit direction as viewed from the first bit of the integer is "1" and the remaining bits are "0". Subsequently, by means of the shift number calculating circuit 160, the exponent correcting signal 161 is rendered to have a value of 12 and the shift control signal 162 is rendered to have a value which designates shifting of 12 upper bits. The exponent correcting circuit 170 calculates a value "1" which is a difference of subtraction of the exponent correcting signal 161 from the common exponent signal 111 and a value "2" which is obtained by adding "1" to the difference. The mantissa of the addition/subtraction result (signal 141) is shifted by 12 bits in the upper bit direction by means of the normalization shift circuit 180 and a value of denormalized number as shown is delivered as a mantissa signal 181.

As described above, by providing the normalization shift limit value generating circuit 150 and the shift number calculating circuit 160, the denormalized number can also be produced similarly to the normalized number through one shift process operation in the normalization shift circuit 180.

An exponent selecting circuit 190 responds to an overflow signal 201 delivered out of a rounding circuit 200 to select one of the signals 171 and 172 and deliver an exponent 191. The rounding circuit 200 performs rounding of the mantissa signal 181 of the normalization result and delivers a mantissa signal 202. When the value of the mantissa is "10.1 . . . 0" at that time, the overflow signal 201 is delivered. In the absence of the delivery of the signal 201, the signal 171 is selected but in the presence of the delivery of the signal 201, the signal 172 is selected. The exponent selecting circuit 190 and rounding circuit 200 function and operate in the same way as those in the prior art shown in FIG. 9.

An overflow deciding/result generating circuit 210 provides a second feature of the present invention. The overflow deciding/result generating circuit 210 receives a rounding mode signal, the result sign signal 101 and the exponent correcting result signal 171 to perform detection of an overflow condition for the result prevailing before the rounding process and calculation of a value to be delivered as an overflow result. More specifically, when the exponent correcting result signal 171 is larger than the maximum value (here, 254) of the exponent of the normalized number, indicating that the overflow condition holds, an overflow detection signal 211 is delivered. The value to be delivered as an overflow result is determined using the rounding mode signal and the result sign signal 101 so that an overflow data signal 212 may be delivered.

More particularly, the circuit 210 produces a value which is the maximum value of the normalized number added with the sign of the arithmetic result when the rounding mode is toward zero, the sign of arithmetic result is positive and the rounding mode is toward negative infinity or the sign of arithmetic result is negative and the rounding mode is toward positive infinity but produces a value which is a value indicative of infinity added with the sign of arithmetic result when the rounding mode is toward nearest value, the sign of arithmetic result is positive and the rounding mode is toward positive infinity or the sign of arithmetic result is negative and the rounding mode is toward negative infinity, thus delivering the produced value as overflow data 212.

A final result selecting circuit 220 receives arithmetic result data consisting of the result sign signal 101, the exponent signal 191 and the mantissa signal 202, overflow data (signal 212) and the overflow detection signal 211 to select the arithmetic result data when the overflow detection signal 211 does not indicate overflow but the overflow data when overflow is indicated.

(2) Floating-point Multiplier

Figure 7:
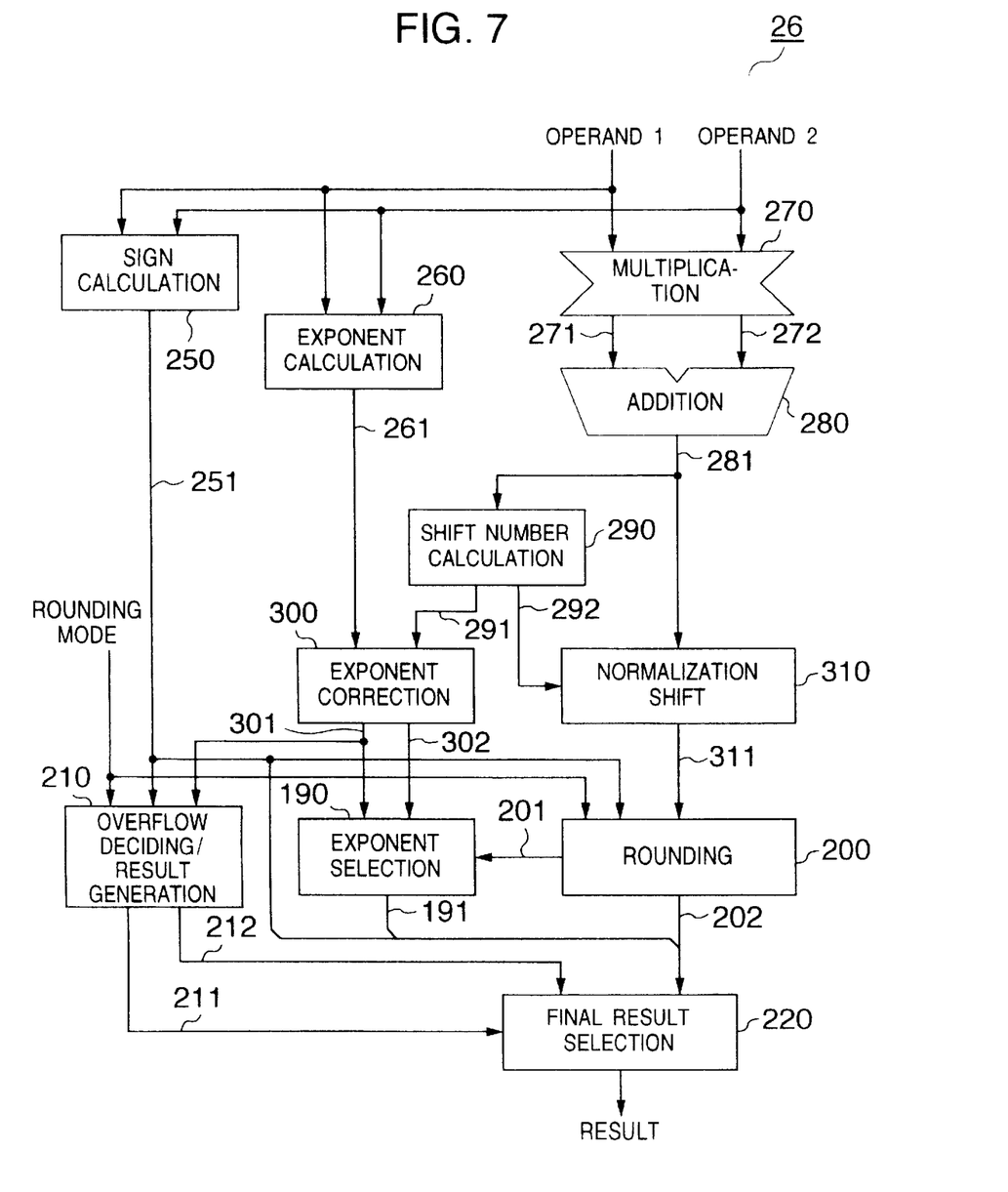
FIG. 7 is a block diagram of a floating-point multiplier according to the present invention.

Referring to FIG. 7, there is illustrated an embodiment of the floating-point multiplier 26 according to the present invention. It is now assumed that data to be handled as an input operand is only a normalized number.

In FIG. 7, a sign calculating circuit 250 receives sign bits of operands 1 and 2 to produce a result sign signal 251. An exponent calculating circuit 260 receives the exponents of the operands 1 and 2 to calculate an exponent signal 261 of a multiplication result. The signal 261 is a value which is a difference of subtraction of an exponent bias from a sum of the exponents of the operands 1 and 2.

A multiplication circuit 270 receives the mantissas of the operands 1 and multiplies them. The multiplication referred to herein is a process in which a plurality of partial products are generated from the mantissas of the operands and they are added to each other by means of an adder to finally produce a set of carry conserving result consisting of a sum signal 271 and a carry signal 272. An addition circuit 280 receives the multiplication result signals 271 and 272 and performs carry propagating addition to produce an addition result signal 281 (the mantissa of multiplication).

A shift number calculating circuit 290 receives the addition result signal 281 to calculate a shift number for normalization. Since the signal 281 is "1.x . . . x" or "1x.x . . . x", where x represents a value which is either "0" or "1", the shift number is "0" or "1" in the lower bit direction. The shift number is delivered as an exponent correcting signal 291 (having a value of "0" or "1") for correction of the exponent signal 261 of the multiplication result in an exponent correcting circuit 300. The shift number is also delivered as a shift control signal 292 (having a value of "0" or "1") for shifting of the addition result signal 281 in a normalization shift circuit 310.

The exponent correcting circuit 300 delivers two kinds of exponent correcting results of which one is a result signal 301 obtained by subtracting the exponent correcting signal 291 (having a value "0" or "−1") from the exponent signal 261 of the multiplication result and the other is a result signal 302 obtained by adding "1" to a difference of the subtraction of the exponent correcting signal 291 from the exponent signal 261 of the multiplication result. The signal 301 becomes effective when the mantissa of the result subjected to the rounding processing in a rounding circuit 200 is "1.x . . . x", and the signal 302 becomes effective when that mantissa is "10.0 . . . 0".

The normalization shift circuit 310 shifts the addition result signal 281 in the lower bit direction by a value of "0" or "1" designated by the normalization shift control signal 292.

An exponent selecting circuit 190 responds to an overflow signal 201 delivered out of the rounding circuit 200 to select one of the signals 301 and 302 and deliver an exponent signal 191. The rounding circuit 200 performs rounding of a mantissa signal 311 of a normalization result and delivers a mantissa signal 202. When the value of the mantissa is "10.0 . . . 0" at that time, the overflow signal 201 is delivered. In the absence of the delivery of the signal 201, the signal 301 is selected but in the presence of the delivery of the signal 201, the signal 302 is selected. The exponent selecting circuit 190 and rounding circuit 200 function and operate in essentially the same way as those of the prior art shown in FIG. 9.

An overflow deciding/result generating circuit 210 receives a rounding mode signal, the result sign signal 251 and the exponent correcting result signal 301 to perform detection of an overflow condition for the result prevailing before the rounding process and calculation of a value to be delivered as an overflow result. More particularly, when the exponent correcting result signal 301 is larger than the maximum value of the exponent of the normalized number, indicating that the overflow condition holds, an overflow detection signal 211 is delivered. The value to be delivered as an overflow result is determined using the rounding mode signal and the result sign signal 251 so that an overflow data signal 212 may be delivered.

A final result selecting circuit 220 receives arithmetic result data consisting of the result sign signal 251, the exponent signal 191 and the mantissa signal 202, overflow data (signal 212) and the overflow detection signal 211 to select the arithmetic result data when the overflow detection signal 211 does not indicate overflow but the overflow data when the overflow detection signal indicates overflow.

The operation of the overflow deciding/result generating circuit 210 and final result selecting circuit 220 is the same as that of the previously-described adder/subtracter (FIG. 1).

(3) Floating-point Divider

The floating-point divider 27 has a similar construction to that of the floating-point multiplier 26 shown in FIG. 7. In the exponent calculating circuit 260, subtraction between the exponents of two operands is carried out. The multiplication circuit 270 and the addition circuit 280 are replaced with a division circuit and a subtraction circuit, respectively, so that a mantissa of subtraction may be produced. Excepting the above, the divider is identical to the multiplier 26 in construction and operation.

Since the construction of the floating-point multiplier 26 is similar to that of the floating-point divider 27, circuit components common to the multiplier and divider may be used in common.

(4) Floating-point Multiplier/Adder Unit

The processor 11 may include a floating-point multiplier/adder unit in place of both the floating-point adder/subtracter 25 and the floating-point multiplier 26.

Figure 8:
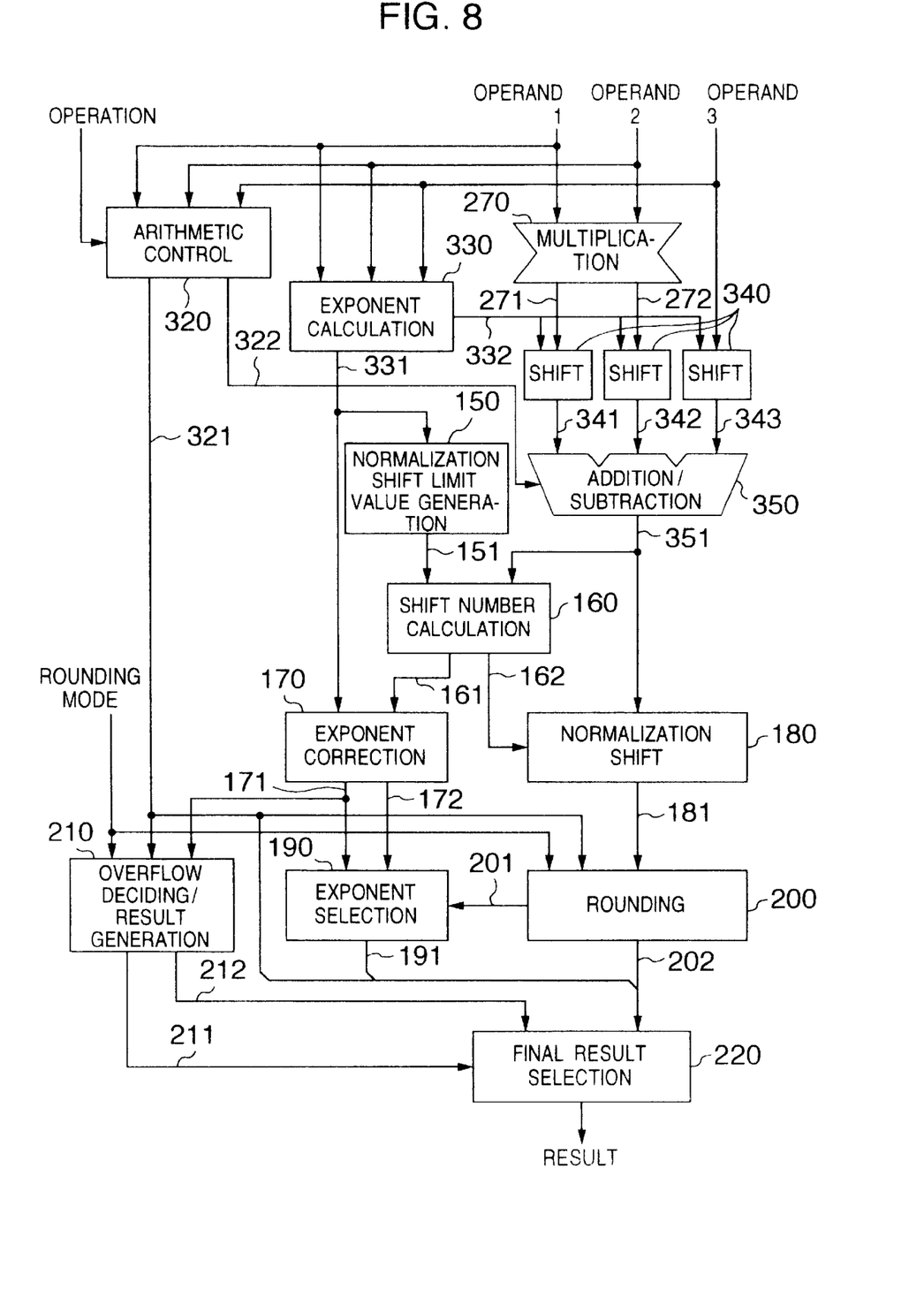
FIG. 8 is a block diagram of a floating-point multiplier/adder unit according to the present invention.

Referring to FIG. 8, there is illustrated an embodiment of a floating-point multiplier/adder unit according to the present invention. The arithmetic unit is for calculating a result of addition or subtraction of an operand 3 to or from a multiplication result of operands 1 and 2. Addition/subtraction and multiplication can otherwise be effected using two of the three operands.

In FIG. 8, an arithmetic control circuit 320 receives the three operands 1, 2 and 3 to produce a result sign signal 321. The arithmetic control circuit 320 also produces an operation signal 322 for designating whether an operation of signal 341+signal 342−signal 343 or an operation of signal 343+signal 341−signal 342 is performed by an addition/subtraction circuit 350.

An exponent calculating circuit 330 receives the operands 1, 2 and 3 to calculate an exponent signal 331 of a multiplication/addition result. The signal 331 takes larger one of values of an exponent of a multiplication result obtained by subtracting an exponent bias from a sum of the exponents of the operands 1 and 2 and of the exponent of the operand 3. The exponent calculating circuit 330 also operates to calculate a difference between the exponent of the multiplication result of the operands 1 and 2 and the exponent of the operand 3 so as to generate a shift control signal 332 used for shifting partial product addition result signals 271 and 272 of a multiplication circuit 270 and the mantissa of the operand 3 in alignment shift circuits 340. When the exponent of the multiplication result of the operands 1 and 2 is larger, the signals 271 and 272 are shifted by "0" and the mantissa of the operand 3 is shifted by a difference between the exponents in the lower bit direction. Conversely, when the exponent of the multiplication result of the operands 1 and 2 is smaller, the operand 3 is shifted by "0" and the signals 271 and 272 are shifted by a difference between the exponents in the lower bit direction.

The multiplication circuit 270 receives the mantissas of the operands 1 and 2 and multiplies them to produce the partial product addition result signals 271 and 272. Essentially, this operation is the same as that of the multiplication circuit 270 of FIG. 7.

The three alignment shift circuits 340 responds to a designation by the alignment shift control signal 332 to shift either the partial product addition results 271 and 272 or the mantissa of the operand 3 in the lower bit direction.

The addition/subtraction circuit 350 receives the three mantissa data pieces 341, 342 and 343 subjected to the bit matching process to perform carry propagating addition and produces an addition/subtraction result signal 351.

The ensuing processing steps are the same as those of the FIG. 1 embodiment.

In the foregoing, the floating-point adder/subtracter, the floating-point multiplier and the floating-point multiplier/adder unit have been described as forms carrying out the present invention but the present invention is not limited thereto and may be applied widely to other arithmetic apparatus in which underflow and overflow exceptions take place.

While the foregoing embodiments have been described by way of a floating point number of single format, the present invention may also be applied to floating point numbers of single extended format, double format and double extended format.

We claim:

1. A floating-point arithmetic processing apparatus for receiving floating-point operands to perform an arithmetic processing so as to produce an intermediate result which in turn is applied with the normalization process and the rounding process, comprising:

an overflow deciding/result generating circuit; and a final result selecting circuit, said overflow deciding/result generating circuit being operative to receive a rounding mode, a sign of an arithmetic result, and an exponent after the normalization process to decide whether an overflow condition is satisfied before the rounding process and to produce a predetermined value and then deliver an over-flow decision result and the produced value when the overflow condition is determined to be met, said final result selecting circuit being operative to receive the overflow decision result, the produced value and a value obtained by applying the normalization process and the rounding process to the intermediate result and to deliver the produced value only when the overflow decision result indicates an overflow but in the other case, the value obtained by applying the normalization process and the rounding process to the intermediate result.

2. A floating-point arithmetic processing apparatus according to claim 1, wherein when the exponent after the normalization process is larger than the maximum value of normalized number, said overflow deciding/result generating circuit determines that the overflow condition is met.

3. A floating-point arithmetic processing apparatus according to claim 1, wherein said overflow deciding/result generating circuit produces a value which is the maximum value of normalized number added with a sign of an arithmetic result when the rounding mode is toward zero, the sign of the arithmetic result is positive and the rounding mode is toward negative infinity or the sign of the arithmetic result is negative and rounding mode is toward positive infinity but produces a value which is a value indicative of infinity added with the sign of the arithmetic result when the rounding mode is toward nearest value, the sign of the arithmetic result is positive and the rounding mode is toward positive infinity or the sign of the arithmetic result is negative and the rounding mode is toward negative infinity.

4. A floating-point arithmetic processing apparatus according to claim 1, wherein said overflow deciding/ result generating circuit produces a value at the time of overflow pursuant to the IEEE Standard 754.

5. A floating-point arithmetic processing apparatus for receiving floating-point operands to perform an arithmetic processing so as to produce an intermediate result which in turn is applied with the normalization process and the rounding process, comprising:

means for detecting a condition for overflow before the rounding process in the phase of having applied the normalization process to said intermediate result;

means for producing a value in the case of overflow as overflow data; and means for receiving a value obtained by applying the normalization process and the rounding process to said intermediate result and said overflow data and delivering said overflow data only when the condition for overflow is detected before the rounding process but in the other case, the value obtained by applying the normalization process and the rounding process to said intermediate result.

6. A floating-point arithmetic processing apparatus for receiving floating-point operands to perform an arithmetic processing so as to produce an intermediate result which in turn is applied with the normalization process and the rounding process, comprising:

a normalization shift value limit generating circuit;

a shift number calculating circuit;

an overflow deciding/result generating circuit; and a final result selecting circuit, said normalization shift limit value generating circuit being operative to receive a value of the exponent of said intermediate result and generate, as a normalization shift limit value, a number obtained by subtracting a value of the exponent of a minimum normalized number from the received value of the exponent of the intermediate result, said shift number calculating circuit being operative to receive the normalization shift limit value and the mantissa of the intermediate result, make smaller one of a shift bit number necessary for rendering the intermediate result a normalized number and the normalization shift limit value a normalization shift number, and deliver the normalization shift limit value to a circuit for performing normalization of the intermediate result so that said intermediate result may be shifted by the normalization shift number, said overflow deciding/result generating circuit being operative to receive a rounding mode, a sign of an arithmetic result, and an exponent subjected to the normalization process to decide whether an overflow condition is satisfied before the rounding process and to produce a predetermined value and then deliver an overflow decision result and the produced value when the overflow condition is determined to be met, and said final result selecting circuit being operative to receive the overflow decision result, the produced value and a value obtained by applying the normalization process and the rounding process to the intermediate result and to deliver the produced value only when the overflow decision result indicates overflow but in the other case, the value obtained by applying the normalization process and the rounding process to the intermediate result.

7. A processor comprising the floating-point arithmetic processing apparatus as recited in claim 6.

* * * * *